May 2, 1950 E. HOLMER 2,506,150
HAY LOADER AND STACKER
Filed July 22, 1946 3 Sheets-Sheet 1

Inventor
Earl Holmer
By Robert M. Dunning
Attorney

May 2, 1950 — E. HOLMER — 2,506,150

HAY LOADER AND STACKER

Filed July 22, 1946 — 3 Sheets-Sheet 2

Inventor
Earl Holmer
By Robert M. Dunning
Attorney

May 2, 1950

E. HOLMER 2,506,150

HAY LOADER AND STACKER

Filed July 22, 1946

Inventor
Earl Holmer
By Robert M. Dunning
Attorney

Patented May 2, 1950

2,506,150

UNITED STATES PATENT OFFICE 2,506,150

HAY LOADER AND STACKER

Earl Holmer, Minneapolis, Minn.

Application July 22, 1946, Serial No. 685,493

5 Claims. (Cl. 214—140)

My invention relates to an improvement in hay loader and stacker, wherein it is desired to provide a loading and stacking apparatus suitable for attachment to a tractor for deriving its power therefrom.

The object of the present invention is to provide a loader and stacker for hay and similar material which is capable of picking up a load of hay from the ground and elevating it either to the top of a stack or into a vehicle. The apparatus comprises a rake which is supported in a position forwardly of the tractor by a suitable elevating frame. Thus the motive power of the tractor may be employed not only for elevating the rake, but also for driving the rake into the hay in order to load the rake.

A feature of the present invention resides in the provision of an elevating frame which is pivoted to a supporting frame extending above the tractor. In picking up a load the elevating frame is inclined forwardly and downwardly from its supporting frame. In elevated position the elevating frame inclines forwardly and upwardly from its supporting frame. By pivoting the elevating frame at a substantial distance from the ground the incline of the elevating frame in elevated position is greatly reduced.

A feature of the present invention comprises the provision of an elevating frame which is extensible in length. As a result the length of the frame may be increased or decreased to suit the convenience of the operator. When the frame is shortened the pull necessary to elevate the load is decreased. When the frame is lengthened the load may be elevated to a greater extent. The operator may set and adjust the length of the frame to suit his convenience.

A further feature of the present invention resides in the fact that the elevating frame may be partially removed from the tractor when it is desired to use the tractor without the rake. By detachably connecting the forward end of the supporting frame, this forwardly projecting frame end may be detached together with the rake which is pivoted thereto. As a result the rake and the forwardly projecting portion of the elevating frame may be removed temporarily when it is desired to use the tractor for other purposes.

An important feature of the present invention resides in the specific means employed to actuate the elevating frame. As previously described the elevating frame is pivoted to a supporting frame at a considerable distance above the ground. A pair of pivoted links are connected together and act to support each side of the elevating frame. One link of each pair is connected to the supporting frame and the other link of each pair is connected to the adjacent side of the elevating frame. By changing the relative angularity between these two links the elevating frame may be raised or lowered.

A feature of the present invention lies in the provision of an elevating frame which may be raised and lowered by pivoted link means and in connecting the connected ends of these links to a cable or the like by means of which the relative angularity between the links of each pair may be adjusted. The links of each pair are angularly spaced a minimum amount when the rake is in lowered position and the links assume substantially aligned position when the rake is elevated.

A feature of my invention lies in providing a means of regulating the speed at which the rake may drop. A compression cylinder apparatus is provided between the elevating frame and the supporting frame to retard the downward pivotal movement of the elevating frame to prevent injury to the parts thereof.

An added feature of the present invention lies in the control used in elevating and lowering the rake. A combined clutch and brake is provided which in one position connects the motive power to the elevating frame to elevate the same and in the other position holds the elevating frame in any adjusted position.

A further feature of the present invention lies in the provision of a means for controlling the level of the rake. This control includes a combined clutch and brake unit which either holds the rake at a predetermined angle relative to the elevating frame which allows the fork to pivot downwardly or swings the end of the rake upwardly.

These and other objects and novel features of my invention will be more clearly and fully set forth in the following specification and claims.

In the drawings forming a part of my specification:

Figure 1:
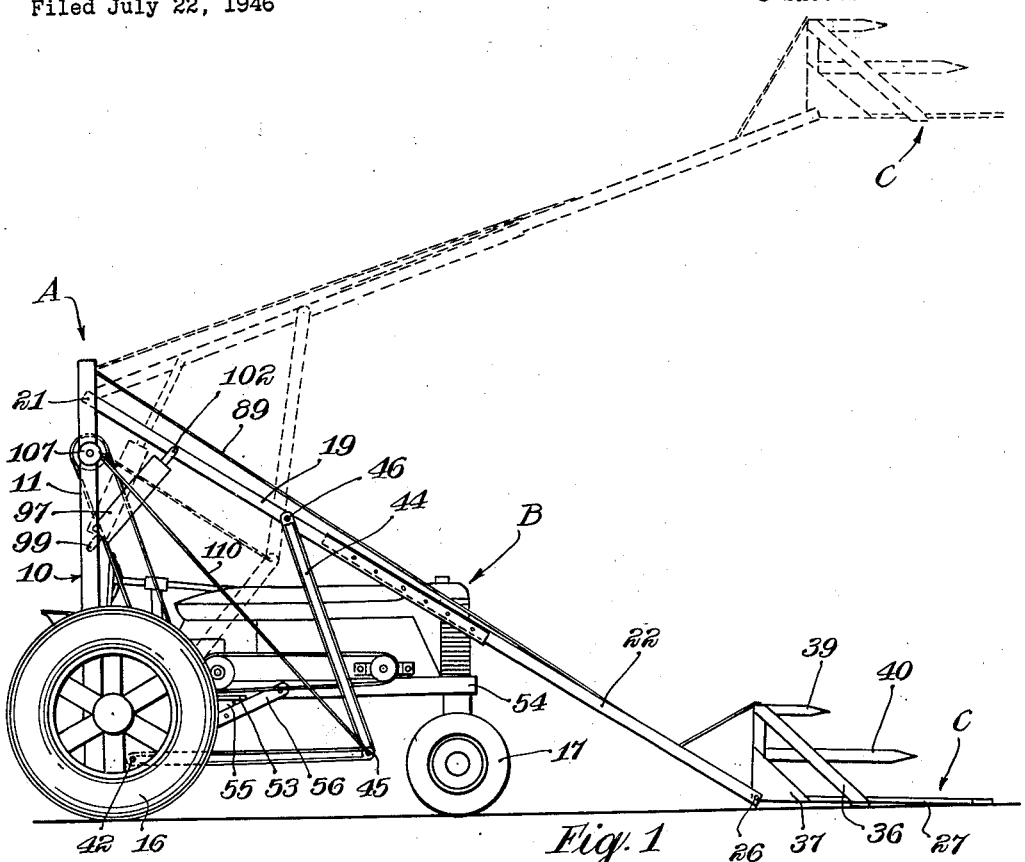
Figure 1 is a side elevational view of my hay stacker and loader showing the construction thereof.

The hay stacker and loader indicated in general by the letter A is mounted upon the tractor B and actuated thereby. In view of the numerous types of tractors manufactured, certain changes must be made in the construction illustrated to fit other types of tractors from that shown. In general, however, the structure need be changed but slightly in such an event and the operation is extremely similar in every case.

The tractor B is provided with a frame 10 which acts as a supporting frame for the loader and which extends upwardly from the tractor.

The frame 10 includes a pair of upright channel members 11 and 12 which are connected at their upper extremity by a cross member 13. The frame 10 is usually held in place by U-bolts such as 14 which extend through the vertical channels 11 and 12 and which extend about the rear axle housing 15 of the tractor. The tractor wheels 16 are of course mounted on the rear axle 15 and in the construction shown the forward end of the tractor is supported by smaller steering wheels 17.

A pair of angle members 19 and 20 are pivotally connected at 21 to the channel members 11 and 12 respectively near the upper extremity thereof. These angle members are adjustably connected by bolts 21 or other suitable means to second angle members 22 and 23. The angles 19 and 22 and the angles 20 and 23 are arranged in telescoping relation and the amount of overlap between these angles may be adjusted so as to extend or shorten the elevating frame of which the angle members form a part.

Figure 3:
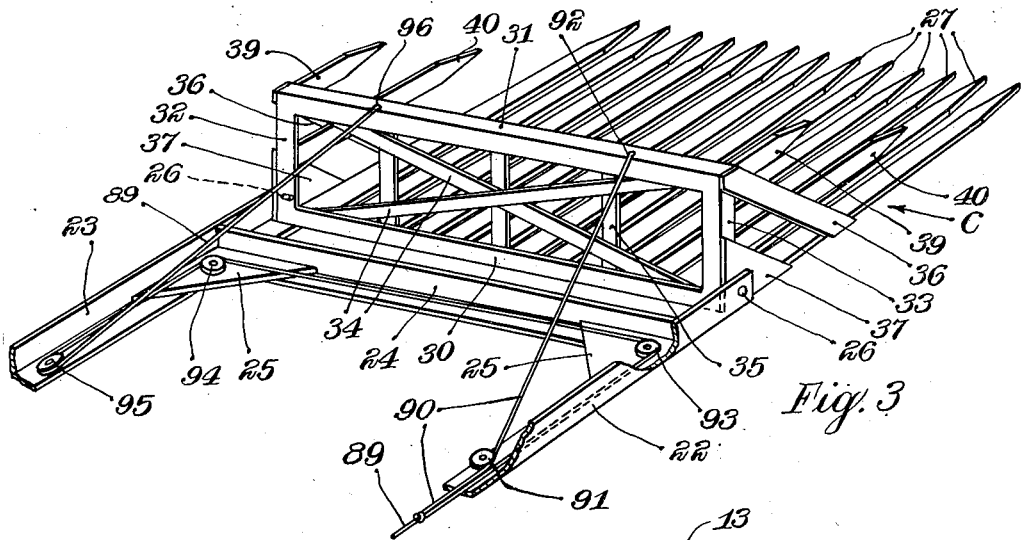
Figure 3 is a perspective view of the rake showing the manner of attachment thereof.

As best illustrated in Figure 3 of the drawings a transversely extending angle member 24 connects the angles 22 and 23 near the forward ends thereof. A gusset plate 25 may be secured between the angles 22 and 23 and the cross member 24 to reinforce the joint therebetween if it is so desired. The forward ends of the angles 22 and 23 are pivotally connected by pivot pins such as 26 to the rake which is indicated in general by the letter C.

Figure 2:
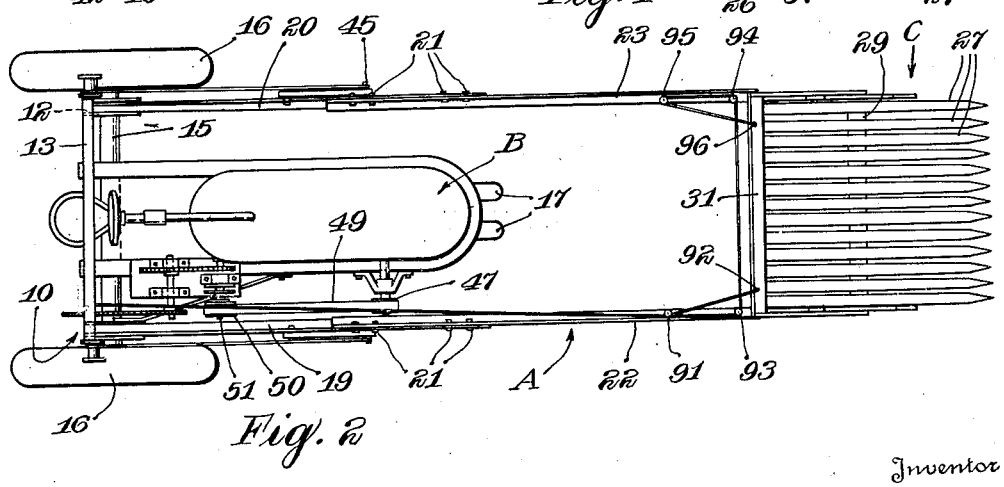
Figure 2 is a plan view of the apparatus shown in Figure 1.

The rake C comprises a series of parallel forwardly extending tines 27 which are preferably pointed at their forward ends so that they may be readily inserted into or beneath a pile of hay or the like. These tines 27 are connected in parallel relation by a cross member 29 illustrated in Figure 2 of the drawings and by an angle 30, best shown in Figure 3 of the drawings. The angle 30 is connected to the tines 27 at their rear ends. This angle member 30 forms the lower side of a rectangular frame extending upwardly at substantially right angles to the tines. The upwardly extending frame includes the angle 30, a parallel angle 31, and vertical angles 32 and 33 connecting the ends of the horizontal angles 30 and 31.

The rectangular frame just described is preferably reinforced by diagonally extending brace bars 34 and by vertically extending braces 35. Inclined braces 36 extend from the top of the frame to the ends of the cross member 29 so as to assist in supporting the tines. Gusset plates 37 also connect the vertical frame members 32 and 33 with the forwardly projecting tines.

In order to prevent hay or other material from falling from the sides of the rake, I provide a pair of superimposed tines on each side of the same. Relatively short tines 39 extend forwardly from the top member 31 of the rectangular frame, while somewhat longer tines 40 extend forwardly from a mid-point between the top and bottom of the rectangular frame. The tines 39 and 40 on each side of the rake are thus in superimposed relation and form sides on the rake.

In order to actuate the elevating frame, I provide a pair of links connecting each of the angle members 19 and 20 to the lower end of the supporting frame 10. One link 41 of each pair is pivotally connected at 42 to a pair of spaced guide plates 43 secured to opposite sides of the vertical channels 11 and 12. The links 41 pivot between the plates 43 and are guided thereby.

The second link 44 of each pair is pivotally connected at 45 to the links 41 and at their other ends are pivoted at 46 to the angles 19 and 20, respectively. By changing the angularity between the links 41 and 44, the elevating frame may be raised or lowered about the pivots 21 connecting the elevating frame to the supporting frame 10.

In lowered position of the rake C, the link 41 may extend substantially horizontally and the link 44 may assume an acute angle relative thereto. However, in elevated position of the rake C, the links 41 and 44 may move into substantial alignment. Means not illustrated in the drawings are provided for limiting the extreme pivotal position of the links 41 and 44 to prevent these links from coming into complete alignment so as to insure the proper lowering of the rake when the means holding the links in substantial alignment is released.

Figure 5:
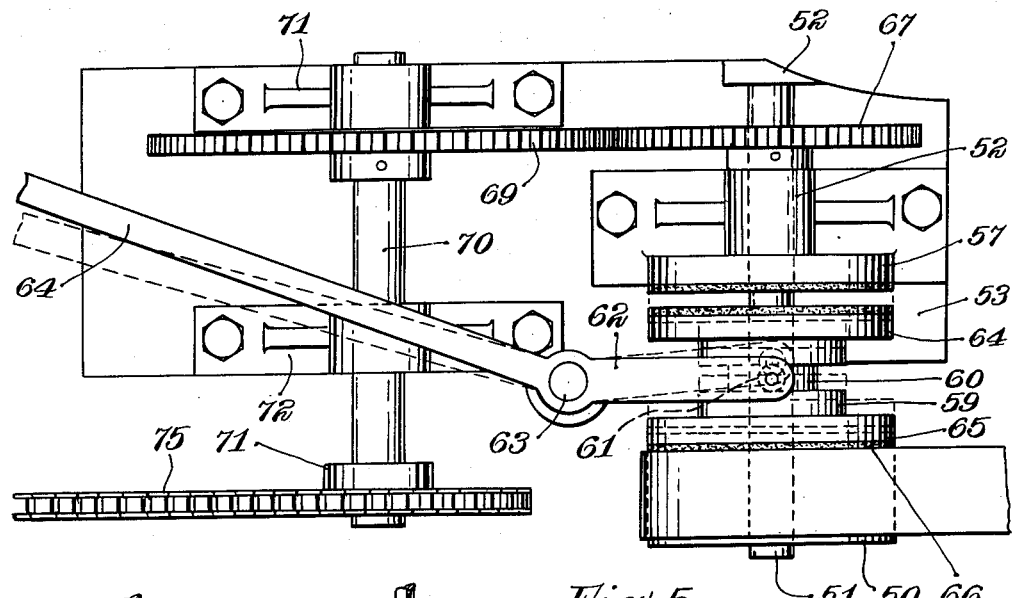
Figure 5 is a top plan view of the control mechanism for controlling the elevation of the rake.

In order to actuate the rake C, I provide a pulley or other drive means 47 connected to the power take-off shaft of the tractor B. Rotation of this pulley 47 acts through the belt 49 to drive a pulley 50 freely rotatable on the clutch shaft 51. The clutch shaft 51, as best illustrated in Figure 5, is supported by bearings 52 mounted upon a platform 53 secured in any suitable way to the frame of the tractor. In the preferred embodiment of the invention, the platform 53 extends laterally from the tractor frame 54 and is supported also by a bracket 55 mounted upon a brace 56 extending between the lower extremity of the frame 10 and the frame of the tractor to hold the frame 10 in vertical position.

The bearing 52 is provided with a friction face plate 57 through which the shaft 51 extends. Keyed on the shaft 51 to rotate therewith, I provide a collar 59 which is grooved at 60 to accommodate the roller 61 of a shifting yoke 62. The shifting yoke 62 is pivoted at 63 to the platfrom 53 and is actuated by a handle lever 64 which may be actuated by the operator.

The collar 59 is provided with a friction face plate 64 on one side thereof and a second friction face plate 65 on the opposite side thereof. The first mentioned friction face plate 64 is designed to engage against the fixed face plate 57 on the bearing 52. The last mentioned face plate 65 on the collar 59 is designed to engage the friction surface 66 of the pulley 50. The pulley 50 is free to rotate upon the clutch shaft 51.

When the handle lever 64 is in the position shown in full lines in Figure 5 of the drawings, the friction faces 65 and 66 are in contacting relation so that rotation of the pulley 50 acts to rotate the collar 59 and accordingly the shaft 51.

When the handle lever 64 is in the position shown in dotted outline in Figure 5 of the drawings the friction surfaces 57 and 64 are engaged, thus holding the shaft stationary. When the collar 59 is intermediate the friction surfaces 67 and 66 the clutch shaft 51 is neither held stationary nor is it driven. As will be later described in intermediate position of the lever 64 the elevated frame may pivot from elevated to lowered position.

A gear 67 is mounted upon the shaft 51 to rotate therewith. A cooperating gear 69 is mounted on a parallel shaft 70 supported by bearings 71 and 72 secured to the platform 53. The gear 69 drives the shaft 70 which in turn rotates the sprocket 71 mounted thereupon. As will be obvious from the foregoing description the sprockets 71 may either be driven in a rotative direction, may be held stationary, or may be free to rotate idly, depending upon the position of the clutch collar 59.

Figure 4:
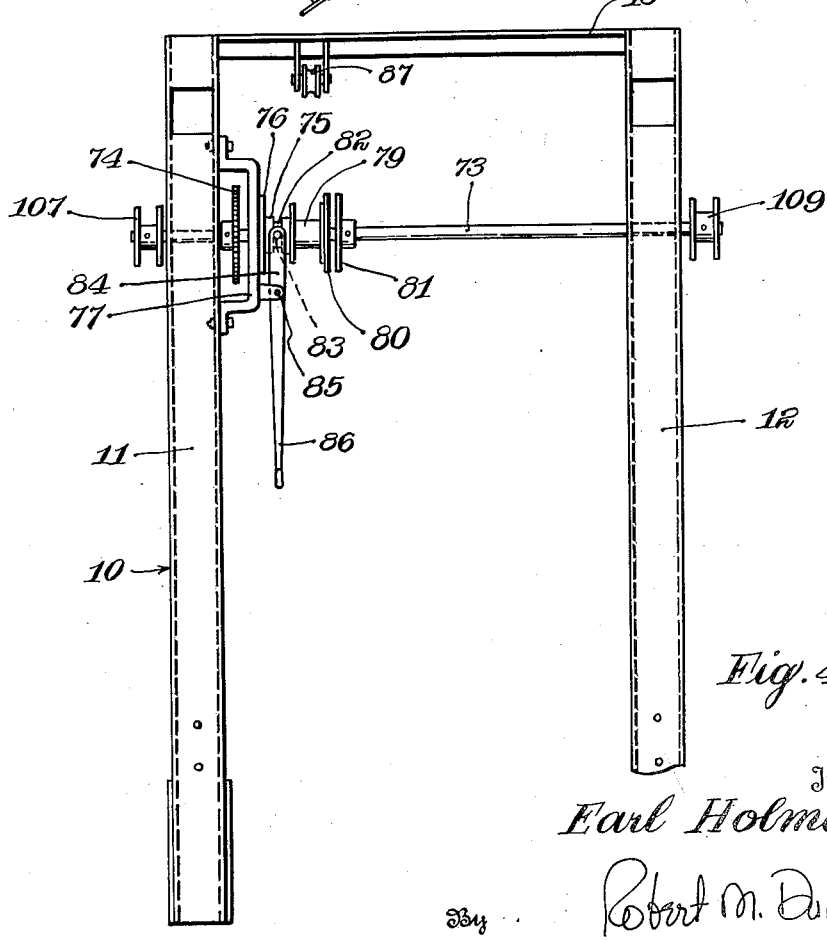
Figure 4 is an elevational view of the supporting frame removed from the tractor and from the elevating frame.

With particular reference now to Figure 4 of the drawings, it will be noted that a shaft 73 extends between the uprights 11 and 12 of the frame 10 at a substantial distance from the ground. A sprocket 74 is mounted upon the shaft 73 to rotate the same. The sprocket 74 is connected by the chain 75 to the sprocket 71 on the shaft 70. Thus the motive power of the tractor may be transmitted through the power take-off pulley and the clutch unit to actuate the shaft 73.

A clutch collar 75 is freely mounted upon the shaft 73. A friction face 76 is provided on one side of the collar 75, which friction face is engageable with the fixed surface of a bracket 77 mounted on the upright 11. The other side of the clutch collar is connected to a cable spool 79 on which a control cable is secured. The cable spool 79 is provided with a friction face 80 which is engageable in one position of the clutch collar 75 with a friction disc 81 secured to the shaft 73 for rotation therewith.

The collar 75 is grooved at 82 to accommodate a roller 83 or pair of opposed rollers mounted on the shifting yoke 84. The yoke 84 is pivoted at 85 to the vehicle frame and the position of the yoke is controlled by actuation of the clutch lever 86. When the clutch collar 75 is in the position illustrated the winding spool 79 is held stationary. When the lever 86 is pivoted in a clockwise direction, as illustrated in Figure 4, the clutch face 80 will be moved into engagement with the friction disc 81 on the shaft 73, causing the cable spool 79 to rotate with the shaft 73.

The control cable from the cable spool 79 may pass over the idle pulley 87 depending from the cross member 13 of the supporting frame. This cable 89 extends toward the free end of the elevating frame to control the angle position of the rake C.

The manner in which the cable 89 is connected to the rake C is best illustrated in Figure 3 of the drawings. The cable 89 is connected to a second cable line 90 at a point spaced from the forward ends of the elevating frame. The cable 90 extends over the pulley 91 supported by the angle member 22 and is terminally connected at 92 to the top cross member 31 of the rectangular frame at the rear end of the rake. Thus by pulling upon the cable 90 the rake is pivoted to incline its pointed ends upwardly. Pivotal movement of the rake takes place about the aligned pivots 26.

In order to equalize the pull upon the rake the cable 89 extends about the pulley 93 near the forward end of the angle 22, extends transversely of the elevating frame to extend about the pulley 94 near the forward end of the angle 23, and then extends about a pulley 95 mounted on the angle 33 in opposed relation to the pulley 91. The cable 89 is terminally connected at 96 to the upper member 31 of the rectangular frame at the rear end of the rake.

As will be seen from the description, a pull upon the cable 89 thus acts upon both the cable parts 89 and 90 to exert a force upon the rake, tending to pivot the rake about the pivots 26. When it is desired to lower the pointed ends of the cradle, it is only necessary to release the tension upon the cable 89, which therefore allows the forward ends of the rake to drop.

Figure 7:
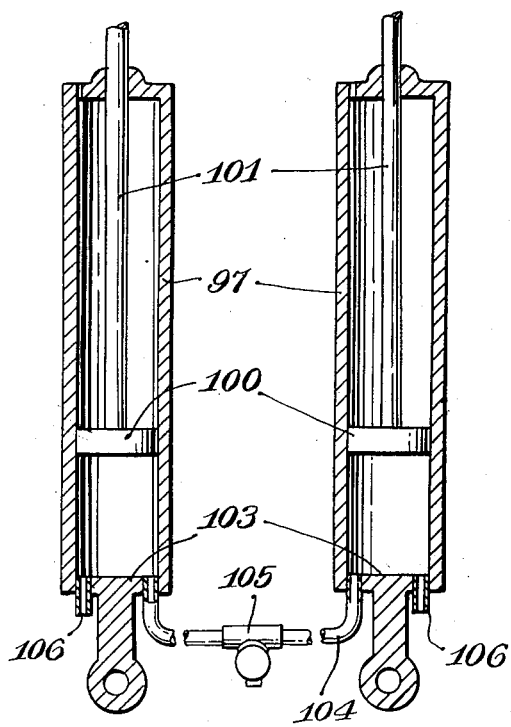
Figure 7 is a diagrammatic view showing the means for controlling the lowering of the rake.
Figure 6:
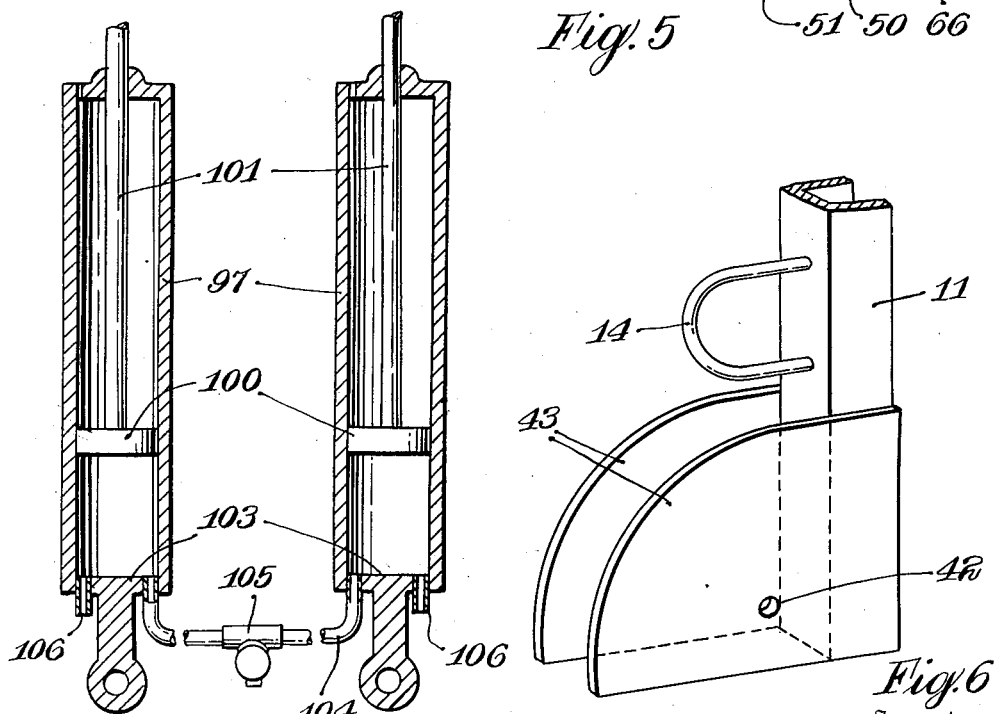
Figure 6 is a perspective view of the lower end of the supporting frame showing the construction thereof.

In order to prevent the rake pivoting downwardly at an excessive rate of speed, I provide means pivotally connected between the upright members 11 and 12 and the angles 19 and 20 which slow the rate of speed at which the rake may drop. This means may comprise the pneumatic cylinders 97 which are pivotally connected at their lower ends 99 to the uprights 10 and 11. These cylinders 97 are diagrammatically illustrated in Figure 7 of the drawings, and are shown as including pistons 100 mounted on pivot rods 101 which extend through the upper ends of the cylinders and are pivotally connected at 102 to the angles 19 and 20. These pneumatic cylinders act as shock absorbers or the like to decrease the pivotal support in lowering the rake C.

In order to control the speed at which the rakes may be lowered the lower ends 103 of the cylinders 97 may be connected by a pipe line 104 which may contain a valve 105. The valve 105 may control the speed at which air leaves the lower portions of the cylinders, thus adjusting the length of time required for the rake to pivot into lowered position. Check valves 106 may also be provided in the lower ends of the cylinders 97 to permit air to enter the cylinders freely as the rake is elevated.

The description of the operation of my hay stacker and loader is believed unnecessary in view of the foregoing description. When it is desired to raise the elevating frame the clutch lever 64 is actuated to move the friction surfaces 65 and 66 together so as to cause rotation of the shaft 51 by the pulley 50. This pivotal movement is transmitted through the gears 67 and 69 and the chains 75 to the shaft 73, causing this shaft to rotate. Cable spools 107 and 108 are mounted upon the ends of this shaft upon which the cables 110 are wound. The cables 110 are connected to the knee joints between the links 41 and 44. Thus as the shaft 73 rotates the cables 110 pivot the links 41 and 44 toward aligned position, thus pivoting the elevated frame upwardly toward the position indicated in dotted outline in Figure 1 of the drawings.

During upward movement of the supporting frame the rake C tends to incline rearwardly as it tends to maintain a substantially fixed angle between the rake and the elevating frame. By proper actuation of the control lever 86 the rake may be allowed to swing downwardly by its own weight and the load may be dumped at the proper time.

When the rake reaches the desired elevation, the upward movement thereof may be stopped by pivoting the lever 64 so that the friction faces 57 and 64 are in contact. The shaft 51 is then held from rotation thus holding the shaft 73 from rotation and holding the rake at the proper elevation. When it is desired to lower the rake the lever 64 may be pivoted to move the clutch collar 59 into an intermediate position, thereby allowing the rake to drop by its own weight. If desired the direction of the driving gear may be reversed so as to assist the downward movement. In many instances, however, this is unnecessary.

During the downward movement of the rake the same may be pivoted into horizontal position by proper manipulation of the lever 86. Rotation of the shaft 73 may act to rotate the cable support 79 so as to elevate the rake.

In accordance with the patent statutes, I have described the principles of construction and operation of my hay stacker and loader, and while I have endeavored to set forth the best embodiment thereof, I desire to have it understood that obvious changes may be made within the scope of the following claims without departing from the spirit of my invention.

I claim:

1. A tractor mounted hay stacker and loader comprising a supporting frame secured to the tractor, an elongated elevating frame pivotally secured to said supporting frame and extending forwardly from said tractor, a load carrier pivotally secured to the forward end of said elevating frame, and means for elevating said elevating frame, said means including a pair of links having one end of each pivotally connected to the other, means connecting the other end of one link to said frame, and means freely pivotally connecting the other end of the other link to the tractor, and cable means connected to said links at the pivot therebetween for pivoting said links to raise and lower said elevating frame.

2. A tractor supported hay stacker and loader comprising a supporting frame secured to the tractor, an elevating frame secured at one end to said supporting frame for pivotal movement relative thereto, said elevating frame being extensible and contractable in length, a rake secured to the forward end of said elevating frame, and means for elevating said elevating frame including a pair of links pivotally connected together at one end thereof, one of said links being connected at its other end to said elevating frame and the other of said links being connected at its other end to the tractor, said connections being pivotal so that said links may pivot toward or away from aligned position to raise and lower said elevating frame and cable means connected to said links at the pivot therebetween for pivoting said links.

3. A tractor supported hay stacker and loader comprising a supporting frame secured to the tractor, an elongated elevating frame pivotally secured to said supporting frame, a load carrier supported by the forward end of said elevating frame, and means interposed between said elevating frame and said supporting frame to cushion downward movement of said supporting frame, said cushioning means comprising a pneumatic cylinder and piston device on each side of said frame for limiting the speed with which said elevating frame may pivot downwardly, connected outlets on said cylinders, and regulating means on the connecting outlets.

4. A tractor supported hay stacker and loader comprising a supporting frame, an elevating frame pivotally secured to said supporting frame, end cable means connected to said elevator frame to elevate and lower the same, said cable being actuated by power from the tractor, this power being transmitted through a combination brake and clutch, said brake and clutch being movable between two extreme positions, one position of the combination acting to hold the elevator frame from movement and the other extreme position acting to operatively connect the tractor power to the cable to operate the same.

5. A tractor supported hay stacker and loader comprising a supporting frame secured to the tractor, an elevating frame pivotally secured to said supporting frame, a rake pivotally secured to an end of said elevating frame, and cable means for controlling the position of said rake relative to said elevating frame and the position of said elevating frame relative to said supporting frame, and means for actuating said cable means including a tractor power take-off, a cable reel on which each of said cables may be wound, means connecting said power take-off to one of said cable reels, combination clutch and brake means interposed between said power take-off and said one cable reel, means connecting said one cable reel with said other cable reel to operate said other cable reel, and combination clutch and brake unit means interposed in said last named connecting means.

EARL HOLMER.

REFERENCES CITED

The following references are of record in the file of this patent:

UNITED STATES PATENTS

| Number | Name | Date |
|---|---|---|
| 1,337,804 | Towson et al. | Apr. 20, 1920 |
| 1,540,327 | Greenleaf | June 2, 1925 |
| 2,246,083 | Weber | June 17, 1941 |
| 2,311,523 | Cope et al. | Feb. 16, 1943 |
| 2,371,273 | Walker | Mar. 13, 1945 |
| 2,388,436 | Onofrio | Nov. 6, 1945 |
| 2,389,029 | Crabtree | Nov. 13, 1945 |
| 2,397,303 | Vowless | Mar. 26, 1946 |
| 2,421,566 | Kober | June 3, 1947 |
| 2,435,098 | Pokorny | Jan. 27, 1948 |